United States Patent [19]

Matthey et al.

[11] 4,036,458

[45] July 19, 1977

[54] DEVICE FOR THE BIDIRECTIONAL MOVEMENT OF AN INFORMATION SUPPORT

[75] Inventors: Henri Matthey, La Chaux de Fonds; Georges Delessert, Vesenaz, both of Switzerland

[73] Assignee: Telectronics SA, Geneva, Switzerland

[21] Appl. No.: 498,968

[22] Filed: Aug. 20, 1974

[30] Foreign Application Priority Data

Sept. 18, 1973  Switzerland .................... 13384/73

[51] Int. Cl.² ............... G03B 1/04; G11B 15/32
[52] U.S. Cl. ............................. 242/201; 242/206; 74/194; 74/207
[58] Field of Search ............ 242/200, 207–209, 242/204, 205, 206, 67.4, 54.1; 74/207, 194

[56] References Cited

U.S. PATENT DOCUMENTS

| | | | |
|---|---|---|---|
| 773,985 | 11/1904 | Ries | 242/54.1 |
| 2,668,059 | 2/1954 | Roberts | 242/201 |
| 2,948,485 | 8/1960 | Cotte | 242/201 |
| 2,951,653 | 9/1960 | Haenel | 242/201 |
| 2,983,457 | 5/1961 | Toro | 242/209 |
| 3,133,710 | 5/1964 | Herterich | 242/201 |
| 3,211,014 | 10/1965 | Sanderson | 74/207 |
| 3,938,758 | 2/1976 | Totino | 242/201 |

Primary Examiner—Leonard D. Christian
Attorney, Agent, or Firm—Young & Thompson

[57] ABSTRACT

The invention concerns a device for the bidirectional displacement of an information support in which one drives alternatively the supplier spool for the rewinding or the receiver spool for the unwinding of the information support by means of mechanical driving means comprising only one motor and in which the inversion of the direction of displacement of the support is obtained through the reversal of the direction of rotation of the motor. The device comprises a frame provided with means intended to receive an information support and receiver and supplier spools; mechanical driving means comprising a motor as well as a member tilting between two positions, the one in which the supplier spool is driven in rotation and the other in which the receiver spool is driven in rotation and in which the inversion of the direction of rotation of the motor causes the movement of this tilting member from one of the said positions into the other.

10 Claims, 10 Drawing Figures

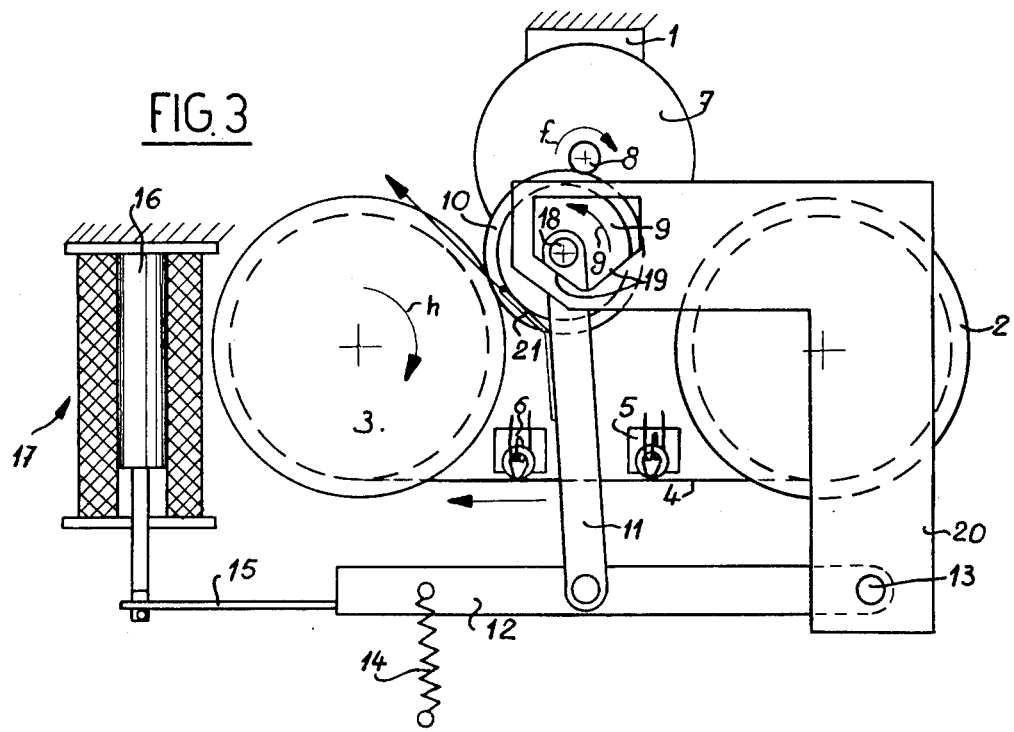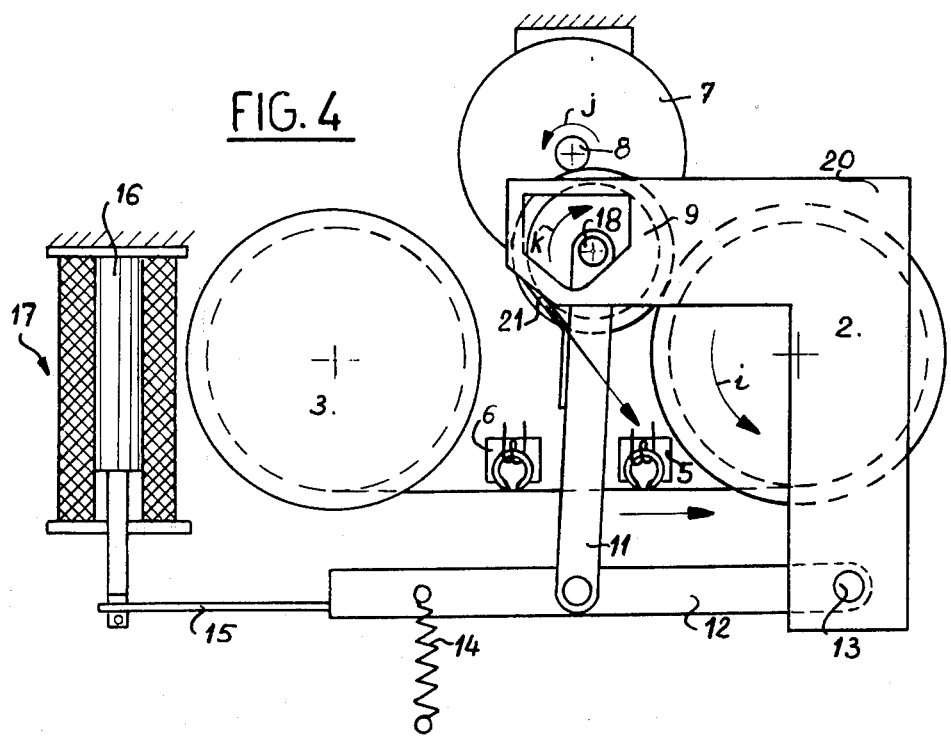

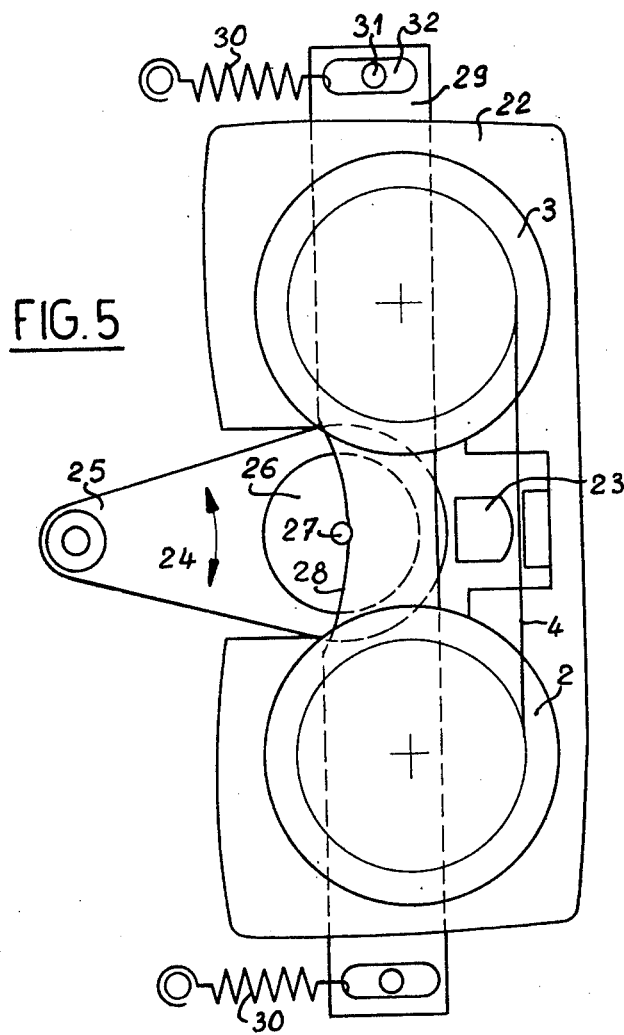
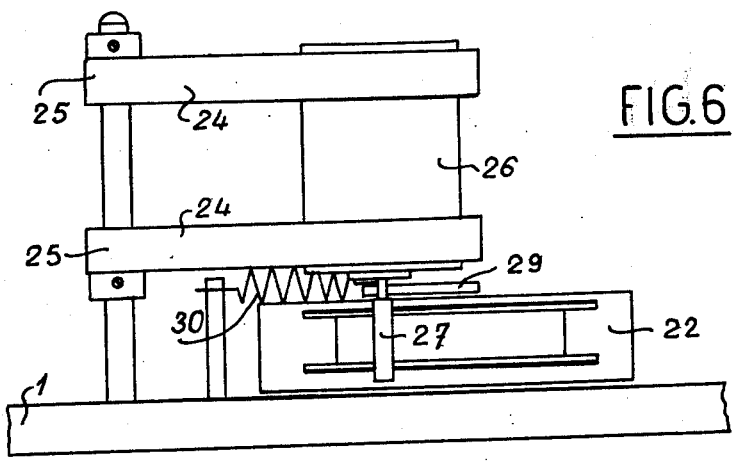

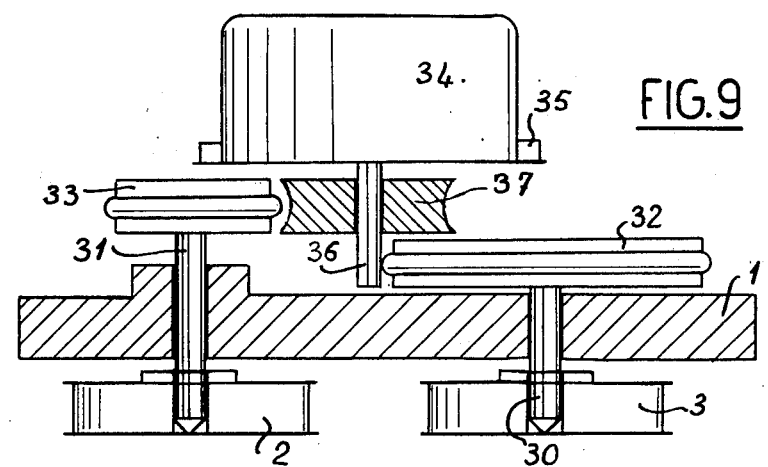
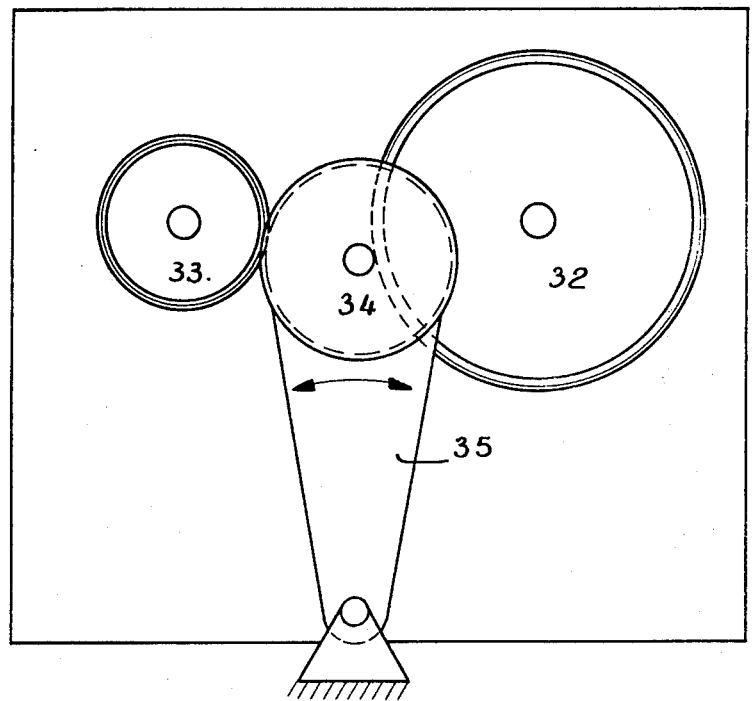

DEVICE FOR THE BIDIRECTIONAL MOVEMENT OF AN INFORMATION SUPPORT

The present invention relates to a device to wind and unwind, that is to say to transfer from a supply spool to a receiving spool and vice and versa, an information support such as a magnetic tape, a film, a perforated tape and so on.

Know devices drive the support through the supply and receiving spools, which necessitates the use of two driving motors and therefore a more expensive device.

The present invention has for its object the provision of a device to wind and unwind an information support. This device distinguishes itself by the fact that one drives alternatively the supply spool for the rewinding or the receiver spool for the unwinding of the information support with mechanical driving means comprising only one motor and by the fact that a control of the direction of the movement of the support is obtained by the reversal of the direction of rotation of the motor.

The invention has further for its object the provision of a device which comprises a frame provided with means intended to receive an information support and its supply and receiver spools and which distinguishes itself by the fact that it comprises mechanical driving means comprising a motor as well as a member tilting between two positions, the one in which the supply spool is driven in rotation and the other in which the receiver spool is driven in rotation, and by the fact that the reversal of the direction of rotation of the motor causes the passage of this tilting member from one of the said positions into the other.

Finally the invention has further for its object the driving of an information support of a remote control alarm installation.

The attached drawings show schematically and by way of example several embodiments of the device according to the invention.

FIGS. 3 and 4 are top plan views of the device shown in FIG. 1 in winding and unwinding positions, respectively.

FIG. 5 is a view from above of a second embodiment of the device in rest position.

FIG. 6 is a cross-section of the device shown in FIG. 5.

FIG. 9 shows in cross-section a third embodiment of the device.

FIG. 10 is a top plan view of the device shown at FIG. 9.

The winding and unwinding method of an information support stored on a supply spool and a receiver spool consists in having only one driving motor, forming part of the mechanical driving means, enabling according to its direction of rotation the driving of the one or the other of these spools to move the support of information in one direction or in the other.

As will be seen later on, in that detailed specification of the embodiment to carry out this invention, the mechanical driving means have a tilting member enabling in one of its positions the driving of the supply spool and in the other position the driving of the receiver spool. The passage from one position into the other of this tilting member is caused solely by the inversion of the direction of rotation of the motor either by inertia forces due to the rotative masses or to friction forces or simultaneously to inertia forces and friction forces.

The information support may be a magnetic tape, a magnetic wire, a film, a punched tape, or any other support able to contain or carry information and able to be wound on itself in order to be stored on two spools.

Figure 1:
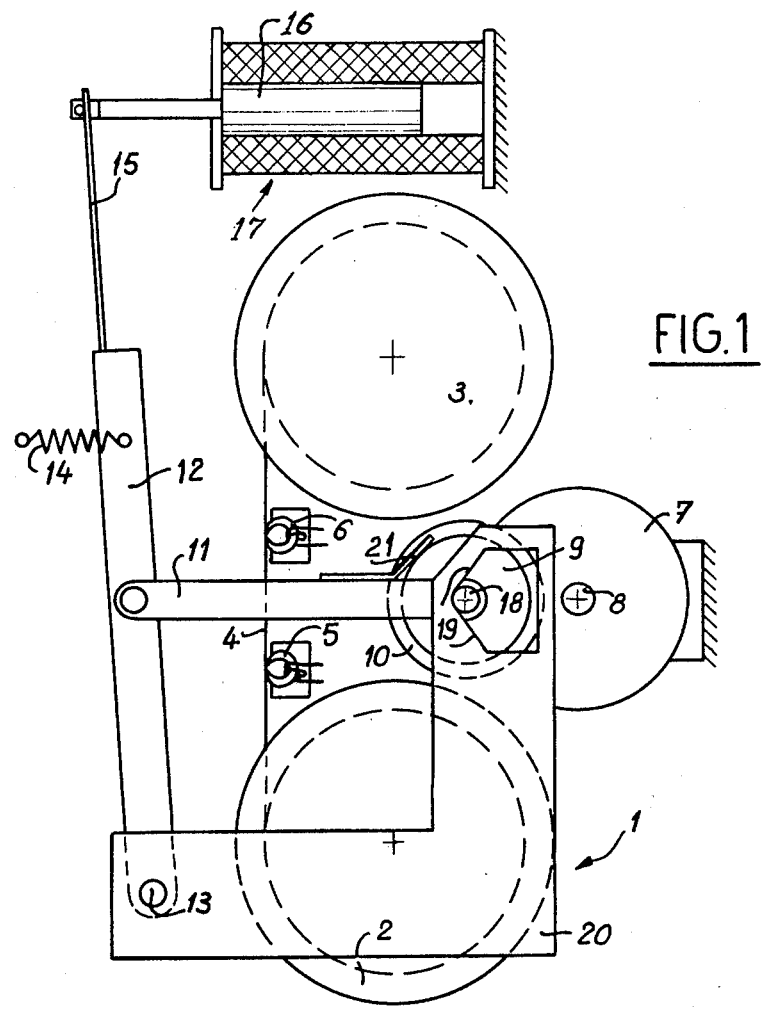
FIG. 1 shows a first embodiment seen in top plan view and in rest position.
Figure 2:
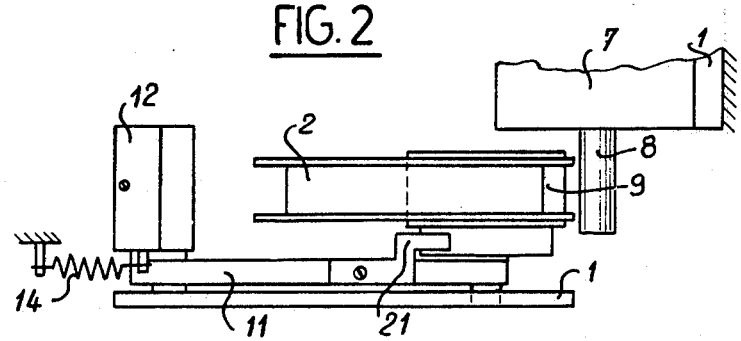
FIG. 2 shows a partial cross-section of the device shown in FIG. 1.

In the embodiment shown in FIGS. 1 to 4, the device to comprises a plate or frame 1 carrying a positioning device of an information support and its supply 2 and receiver 3 spools. This positioning device which is not shown may comprise fixed axes on which the spools are pivoted or if the spools are themselves mounted in a housing of a cassette type, the positioning and fixing means of this cassette on the frame 1.

When the information support 4 is in service position on the frame 1, its free portion extending between the two spools 2, 3 passes in front of reading heads 5, 6. The spools 2, 3 are idly mounted on their axes however a certain braking is present to avoid an unwanted unrolling of the tape 4 and to produce the necessary tension for a good contact of this tape 4 on the heads 5 and 6.

The mechanical driving device of the information support 4 in its winding and unwinding displacements comprises a motor 7, for example a direct current motor which can be fed by batteries. This motor can, by the reversal of the polarity of its excitation be driven either in one direction or in the other. The axle 8 of this motor 7 emerges from it and may enter in contact with an idle roller 9 normally maintained in rest position out of engagement with this axle of the motor 8.

This idle roller 9 comprises a resilient periphery 10 and is idly rotatable on the outer end of a tilting arm 11, the other end of which is hinged on a lever 12. This lever 12 is itself hinged at one of its ends on a base plate or frame 1 at 13. This lever 12 is maintained in its retracted rest position, away from the motor 7 by means of a spring 14. The free end of the lever 12 is provided with a spring rod 15 the free end of which is connected to the core of the plunger 16 of an electro magnet 17. This rest position of the lever 12 and thus of the roller 9 is determined by the contact of the axle 18 of the roller 9 with the bottom of a V formed by two inclined edges 19 of an opening provided in a guide 20 fast with the frame 1. In this rest position the straight line formed by the axis of the hinge of the arm 11 on to the lever 12, the axle 18 of the roller 9 and the axle 8 of the motor 7 makes a right angle with a line passing through the axes of the spools 2 and 3. Furthermore, the roller 9 is not in contact with any mechanical part so that its resilient periphery incurs no permanent deformation whatever the duration of rest of the device is. The friction brake 21 acts on the roller 9 so that the setting in rotation of it necessitates a torque which is not equal to 0.

To move the tape 4 in front of the heads 5 and 6, that is to say to displace it from the supply spool 2 to the receiver spool 3, the motor 7 is excited in order to drive it in clockwise rotation (arrow f) and the electromagnet is excited displacing the plunger 16 thus the lever 12 against the action of the spring 14. By this the arm is displaced toward the motor 7 and the roller 9 enters in contact with the axle of the motor which revolves in the direction of the arrow f. Through the inertia of the roller 9 which is artificially increased by the action of the friction brake 21, the roller 9 is driven toward the left (FIG. 3) before it is driven in rotation in the direction of the arrow g. This tilting of the roller 9 is possible through the hinging of the arm 11 on the lever 12. This lateral tilting takes place up to the moment when the roller 9 abuts against the periphery of the flanges of the receiver spool 3. From this moment the roller 9 is wedged between the axle 8 of the motor 7 and the spool 3 through the action of the said axle 8 revolving in the direction of the arrow f, and through the application force transmitted to the arm 11 by the bending of the rod 15. The driving of the information support 4 is thus effected, the roller 9 transmitting through friction the movement of the axle 8 to the receiver spool 3 which is driven in rotation in the direction of the arrow h that is in the same direction as the motor 7. The tape 4 winds thus on the spool 3, the spool 2 revolving freely.

When it is desired to stop the movement of the tape 4, the electro magnet 17 and the motor 7 are de-energized. The motor stops revolving and the lever 12 comes back in rest position under the action of the spring 14 replacing thus the roller 9 in rest position centered in the V of the guide 20.

To drive the tape 4 in the other direction, that is to rewind it onto the supplier spool 2 the motor 7 is excited so that its axle 8 revolves counterclockwise and the electro-magnet is again excited. This time, the roller 9 is deflected toward the right (FIG. 4) and assumes the driving position between the motor 7 and the supplier spool 2 causing its rotation in the direction of the arrow i and thus the rewinding of the tape 4. The device comes automatically back in rest position as soon as the motor 7 and the electro-magnet are deenergized.

Figure 7:
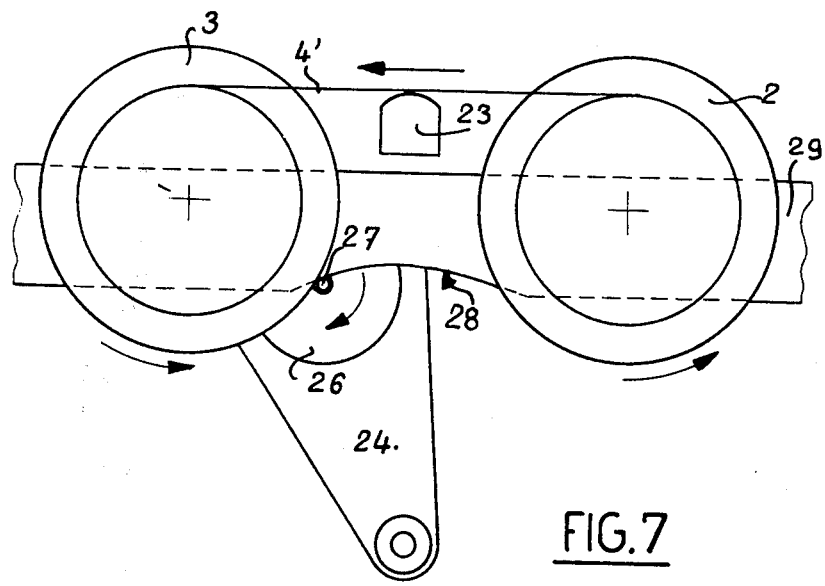
FIGS. 7 and 8 are top plan views of the device shown in FIG. 5 in winding and unwinding positions, respectively.
Figure 8:
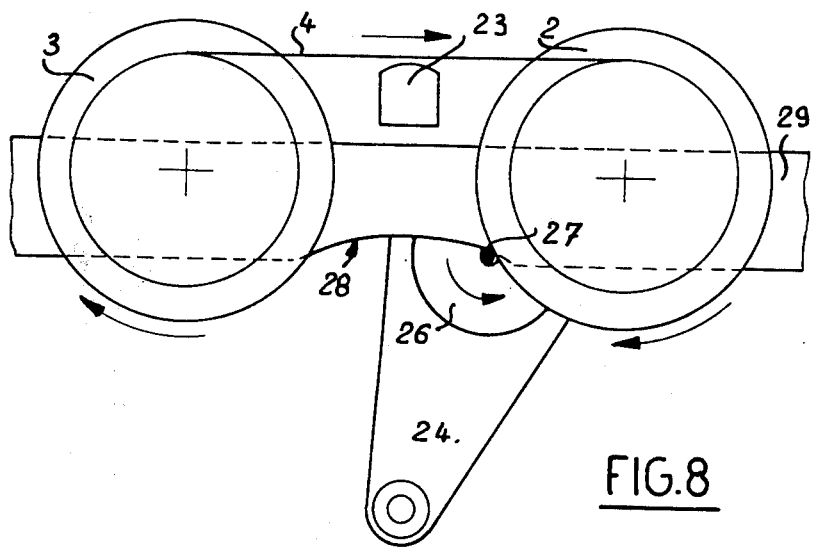

In the embodiment shown in FIGS. 5 to 8, the information support 4 is mounted on a cassette 22 in which are rotatable the supplier and receiver spools 2 and 3. When the cassette 22 is placed in service position on a plate 1 by means of a positioning device (not shown), the information support is placed in front of a reading head 23.

In this embodiment the mechanical driving device of the tape 4 in its winding and rewinding displacements is constitued by a tilting arm 24 pivoted at one of this ends 25 on the plate or frame 1. The other end of this oscillating arm carries the motor 26 the axle 27 of which extends parallel to the axes of the spools 2 and 3. The axle 27 of this motor emerges from it and enters into contact with the edge 28 having the shape of an arc of a circle of a friction member 29. This friction member 29 is maintained by means of the springs 30 against the axle 27 of the motor 26. The pins 31 fastened on the frame 1 and passing through the elongated openings 32 provided in the friction member 29 permit guided movement.

When the motor 26 is energised in order to drive its axle clockwise (FIG. 7), the axle 27 rolls against the friction member 29 causing the lateral tilting of the arm 24 up to the moment where this axle enters into contact with the periphery of the lower and upper flanges of the receiver spool 3. The axle 27 is provided with a resilient and/or antislip periphery.

From this moment on, the angle formed by the periphery of the spool 3 and the arc of circular edge 28 of the friction member 29 being very large, the tilting of the arm 24 is stopped and the spool 3 is driven in rotation counterclockwise through the axle 27 of the motor 26.

When the operator wants to rewind the tape 4 on the supplier spool 2, he cuts the energisation of the motor 26. The driving of the spool 3 is stopped and the axle 27 is somewhat displaced from the periphery of the flanges of this spool.

Afterwards, the motor 26 is again energised in such a way that its axle revolves counterclockwise, and through friction this axle rolls along the curved edge 28 of the friction member 29 causing the tilting of the arm 24 up to the moment when the axle 27 enters into contact with the lower and upper flanges of the supplier spool 2 (FIG. 8) causing in a similar way as that described hereabove the driving in rotation of this spool 2 clockwise and thus the rewinding of the tape 4.

In the first embodiment described, the tilting of the oscillating member of the mechanical driving linkage is caused by the reactions to the inertia forces for the setting into rotation of the roller 9 whereas in the second embodiment this tilting is due to friction forces. However in both cases the effect is the same, one selects through the direction of rotation of the motor the direction of movement of the tape 4 without any other mechanical control action.

The third embodiment shown in FIGS. 9 and 10 comprises a base plate 1 in which driving axles 30, 31 are rotatable. These axles 30, 31 project from both sides of plate 1 and one of their ends receives a receiver spool 3 or a supplier spool 2. The other end of the axle 30 is provided with a wheel 32 presenting a resilient periphery whereas the other end of the axle 31 comprises a roller 33 also provided with a resilient periphery. The roller 33 is of smaller diameter than the wheel 32 and is located in a different plane.

An electric motor 34 having two directions of rotation is carried by a tilting arm 35 hinged on the base plate 1. The axle 36 of this motor extends between the wheel 32 and the roller 33 and carries an inertia wheel 37 disposed in the same plane as the roller 33.

When the motor 34 is energised, the inertia of its rotor and of the inertia wheel 37 causes, during its setting in rotation, a tilting of the arm 35 in one direction or in the other according to the direction of rotation of the motor. In the case of the unwinding of an information support from one of the spools 2, 3, the axle 36 of the motor comes through this tilting of the arm 35, into contact with the wheel 32 and causes the driving in rotation of the receiver spool 3 at the desired speed for the reading of the information contained on the support.

When the motor revolves in the reverse direction, the inertia wheel 37 enters into contact with the roller 33, and causes the driving at great speed of the spool 2 in the direction corresponding to the rewinding of the information support.

I claim:

1. A device for the bidirectional feeding of an information support having first and second spools about which the support is wound, a reversible motor with a driving shaft, an idle roller, means mounting said idle roller for movement between three positions, said idle roller contacting said driving shaft and said first spool in one of said positions, said idle roller contacting said driving shaft and said second spool in a second of said positions, and said idle roller being out of contact with said driving shaft in the third of said positions, and means for moving said idle roller selectively to any of said three positions.

2. A device as claimed in claim 1, said idle roller in said third position being out of contact with both of said spools.

3. A device as claimed in claim 1, the last-named means comprising an arm on one end of which said idle roller is rotatably mounted, the other end of said arm being pivotally mounted to a lever, and means for selectively swinging said lever.

4. A device as claimed in claim 3, said swinging means comprising an electromagnet.

5. A device as claimed in claim 3, said driving shaft and the axes of rotation of said spools forming the apices of a triangle, the point of pivotal connection of said arm to said lever lying outside said triangle.

6. A device as claimed in claim 3, and a supporting bracket having an opening therein which is bounded by V-shaped guide edges, said idle roller having a shaft that is disposed at the apex of the V-shaped guide surfaces and in contact with said guide surfaces when said idle roller is in said third position.

7. A device as claimed in claim 1, in which said idle roller has a resilient periphery.

8. A device for the bidirectional feeding of an information support having first and second spools about which the support is wound, a reversible motor having a driving shaft, pivotally mounted support means upon which the reversible motor is mounted, and means urging said driving shaft into frictional contact with the first or second spools depending upon the direction of motor rotation, the last-named means comprising a plate, and resilient means yieldably urging an edge of said plate into frictional contact with said driving shaft, whereby rotation of said motor to rotate said driving shaft in one direction causes said driving shaft and motor to move along said edge in one direction until said driving shaft is in frictional contact with one of said spools, and reversal of said motor thereby to rotate said driving shaft in the opposite direction causes said driving shaft and motor to move along said edge in the opposite direction until the driving shaft is in frictional contact with the other of said spools.

9. A device as claimed in claim 8, wherein said edge of said plate is concavely curved.

10. A device for the bidirectional feeding of an information support having first and second spools about which the support is wound, a reversible motor having a driving shaft, pivotally mounted support means upon which the reversible motor is mounted, and means urging said driving shaft into contact with the first or second spools depending upon the direction of motor rotation, the last-named means including an inertia wheel on the driving shaft.

* * * * *